(12) United States Patent
Tolboom

(10) Patent No.: US 11,536,379 B2
(45) Date of Patent: Dec. 27, 2022

(54) BALL VALVE AND VALVE OPERATING METHOD

(71) Applicant: Tolboom Valve B.V., Reeuwijk (NL)

(72) Inventor: Theodorus Johannes Tolboom, Reeuwijk (NL)

(73) Assignee: Tolboom Valve B.V., Reeuwijk (NL)

( * ) Notice: Subject to any disclaimer, the term of this patent is extended or adjusted under 35 U.S.C. 154(b) by 0 days.

(21) Appl. No.: 17/059,402

(22) PCT Filed: May 31, 2019

(86) PCT No.: PCT/EP2019/064246
§ 371 (c)(1),
(2) Date: Nov. 27, 2020

(87) PCT Pub. No.: WO2019/229265
PCT Pub. Date: Dec. 5, 2019

(65) Prior Publication Data
US 2021/0215259 A1    Jul. 15, 2021

(30) Foreign Application Priority Data

May 31, 2018   (NL) .................................... 2021029
Oct. 13, 2018   (NL) .................................... 2021810
Jan. 11, 2019   (NL) .................................... 2022375

(51) Int. Cl.
*F16K 5/20*    (2006.01)

(52) U.S. Cl.
CPC ................... *F16K 5/204* (2013.01)

(58) Field of Classification Search
CPC ............................... F16K 5/204; F16K 5/184
See application file for complete search history.

(56) References Cited

U.S. PATENT DOCUMENTS

| | | | | |
|---|---|---|---|---|
| 2,200,474 A | * | 5/1940 | Heggem | F16K 5/204 251/163 |
| 2,690,894 A | * | 10/1954 | Blevans | F16K 5/0647 251/163 |
| 2,988,109 A | * | 6/1961 | Komrosky | F16K 5/204 137/630.15 |
| 3,033,513 A | * | 5/1962 | Paulvulliez | F16K 5/162 251/163 |

(Continued)

FOREIGN PATENT DOCUMENTS

GB             338913 A  *  11/1930  ............. F16K 5/204

*Primary Examiner* — David Colon-Morales
(74) *Attorney, Agent, or Firm* — Schroeder Law PC

(57) ABSTRACT

This invention relates to a valve comprising: —a body with a first port, a second port and an interior space extending between the first and second port; —a seat arranged in the interior space; —a valve member moveably arranged inside the interior space to cooperate with the seat; and —a stem to move the valve member, wherein the stem is rotatable between a first rotational position and a third rotational position with a second rotational position in between the first and third rotational position, wherein in between the first and second rotational position the valve member and the stem are coupled according to a first configuration, and wherein in between the second and third rotational position, the valve member and the stem are coupled according to a second configuration different from the first configuration.

17 Claims, 9 Drawing Sheets

(56) References Cited

U.S. PATENT DOCUMENTS

| | | | | |
|---|---|---|---|---|
| 3,515,371 | A * | 6/1970 | Jones, Jr. | F16K 41/02 |
| | | | | 251/214 |
| 3,941,351 | A * | 3/1976 | Graham | F16K 5/0647 |
| | | | | 251/161 |
| 4,029,292 | A * | 6/1977 | Kramer | F16K 5/204 |
| | | | | 251/163 |
| 4,940,210 | A * | 7/1990 | Gilmore | F16K 5/204 |
| | | | | 251/160 |
| 5,265,845 | A * | 11/1993 | Gilliam | F16K 5/204 |
| | | | | 251/163 |
| 5,308,039 | A * | 5/1994 | King | F16K 5/204 |
| | | | | 251/188 |
| 5,417,404 | A * | 5/1995 | Varden | F16K 5/204 |
| | | | | 251/165 |
| 7,775,502 | B2 * | 8/2010 | Ohta | F16K 5/0647 |
| | | | | 251/56 |
| 9,279,505 | B2 * | 3/2016 | Yuan | F16K 5/204 |
| 9,903,483 | B2 * | 2/2018 | Liu | F16K 5/204 |

* cited by examiner

FIG. 4A    FIG. 4B    FIG. 4C
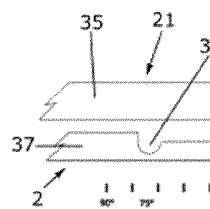 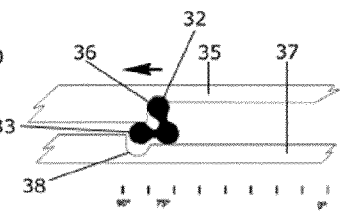 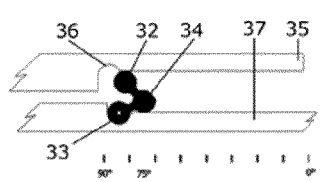
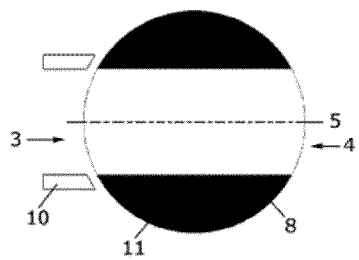 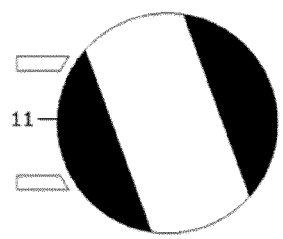 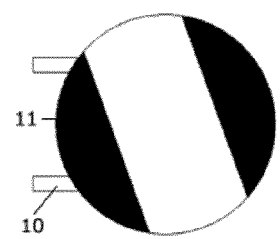
FIG. 5
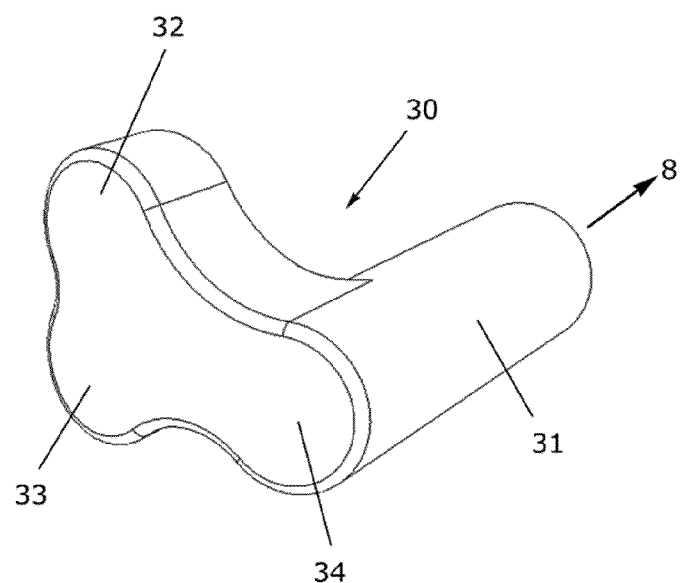

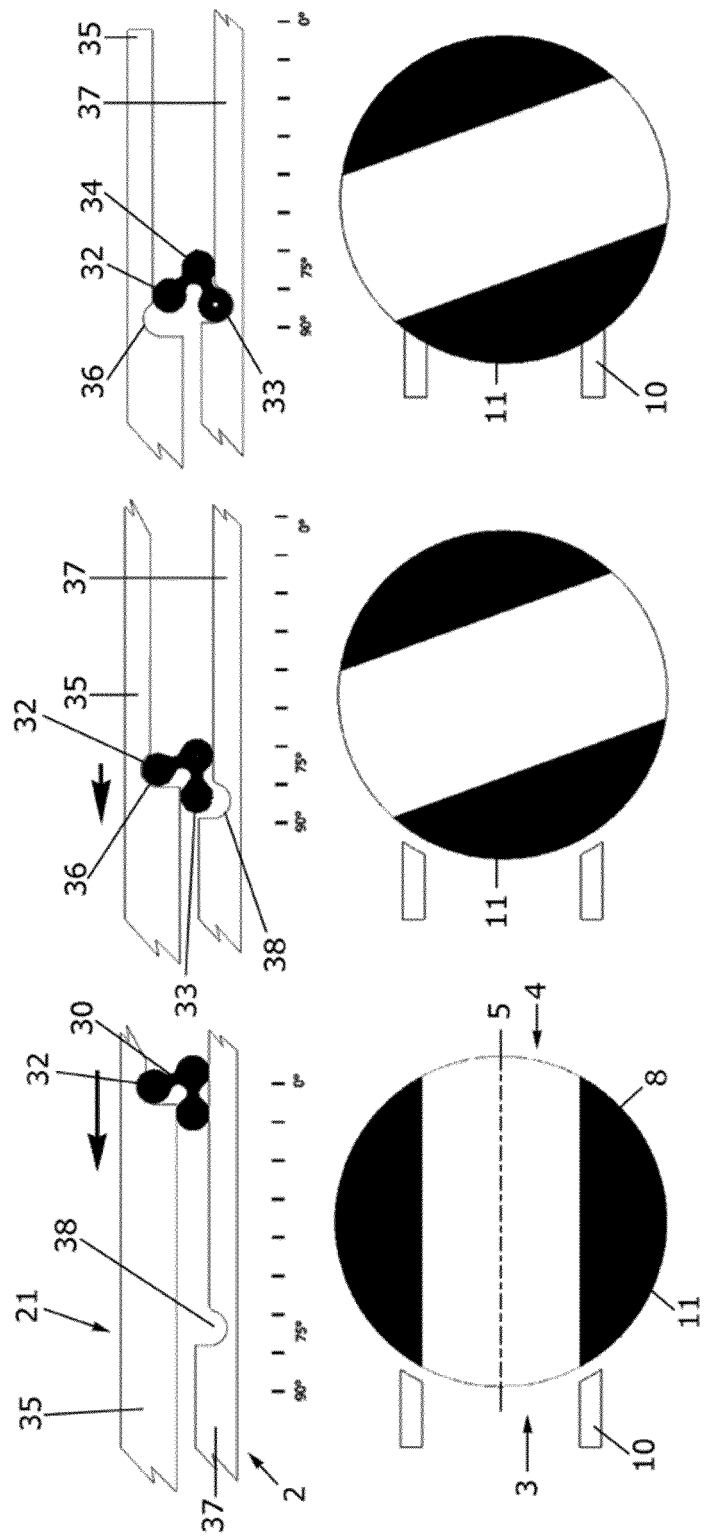

BALL VALVE AND VALVE OPERATING METHOD

BACKGROUND OF THE INVENTION

The invention relates to a valve, in particular a ball valve, to regulate, direct or control a fluid flow through the valve. Such valves are commonly known and usually include at least the following components:
- a body with a first port, a second port and an interior space extending between the first and second port;
- a seat arranged in the interior space of the body;
- a valve member moveably arranged inside the interior space of the body to cooperate with the seat; and
- a stem engaging with the valve member to move the valve member.

The valve member usually includes a valve disc configured to engage with the seat in an engagement position of the valve member, e.g. to close the fluid flow through the seat or to direct the fluid flow to travel along a predetermined flow path.

Many ball valves are of the type in which the valve member is rotated inside the body while being kept in contact with the seat. This type of ball valve poses a problem in that the valve member is rotated or slidingly rotated while being kept in contact with the seat member continuously applying a surface pressure, the seat and/or the valve disc is worn away and hence the sealing capability may not last for a long period of time.

In order to address this problem, another type of ball valve has been proposed in US patent publication U.S. Pat. No. 3,515,371. U.S. Pat. No. 3,515,371 teaches to use a stem that engages with the valve member and is moved axially by rotating an inwardly threaded nut relative to an outwardly threaded portion of the stem. A guide pin is arranged in the housing to cooperate with a groove formed on an outer circumference of the stem thereby controlling movement of the stem and thus the valve member during axial movement of the stem. The groove has a straight guide portion and a rotation guide portion. When the guide pin is received in the rotation guide portion, a rotation transmitting part of the stem is in contact with the valve member allowing to rotate the valve member about a rotation axis. When the guide pin is received in the straight guide portion, rotation of the valve member about said rotation axis is prevented and a pressing-force transmitting part of the stem with inclined surfaces is in contact with the valve member to press the valve member against the seat. During the entire movement of the valve member, the coupling between the stem and the valve member is the same, namely that the same end of the stem is in operational contact with the same portion of the valve member. It is further noted that the valve member is moved by first simultaneously translating and rotating the stem and subsequently only translating the stem without rotating the stem.

A drawback of this type of ball valve is the required installation space of the ball valve. Further, due to the use of the rotatable nut and the outwardly threaded portion of the stem to move the stem in axial direction, it takes considerable time to move the valve member which makes the ball valve less suitable for automatic flow-rate control or the like. It further takes considerable high force to open or close the valve.

To address the drawbacks of U.S. Pat. No. 3,515,371, yet another type of ball valve has been proposed in US patent publication US2008/0093574. US2008/0093574 teaches to use two stems, namely a first stem connected to the valve member so as to be capable of transmitting rotational force about a rotational axis to the valve member, and a second stem to be oppositely located to the first stem with the valve member therebetween. The second stem is rotatable about an axis coaxial or parallel with the first stem to press the valve member towards the seat. Again, during the entire movement of the valve member, the coupling between the two stems and the valve member is the same, namely that the same ends of the first and second stem are in operational contact with the same respective portions of the valve member. It is further noted that the valve member is moved by first rotating the first stem and subsequently by rotating the second stem without rotating the first stem.

A drawback of this type of ball valve is that it is required to operate two stems at opposite sides of the valve which makes operation more complex compared to other regularly used ball valves. It further introduces the risk that the first stem is already operated when the valve member is still pressed against the seat, so that there is again a risk of wearing the valve disc and thus deteriorating the sealing capability, and the risk that operating the second stem is forgotten for sealing off and thus the valve is not closed entirely.

BRIEF SUMMARY OF THE INVENTION

In view of the above, it is an object of the invention to provide a valve, in particular a ball valve, with a reduced size and easy and instant operation while being capable of minimizing, preferably avoiding, the wearing of the seat and/or the valve disc of the valve member.

According to a first aspect of the invention, there is provided a ball valve to regulate, direct or control a fluid flow through the valve, comprising:
- a body with a first port, a second port and an interior space extending between the first and second port;
- a seat arranged in the interior space of the body;
- a valve member moveably arranged inside the interior space of the body to cooperate with the seat; and
- a stem engaging with the valve member to move the valve member, wherein the valve member includes a valve disc configured to engage with the seat in an engagement position of the valve member, wherein the valve member is moveable between the engagement position and a first position via a second position, wherein in the second position of the valve member the valve disc is aligned with the seat at a distance from the seat, wherein in the first position of the valve member the valve disc is at a larger distance from the seat than in the second position, wherein the valve member is rotatable between the first position and the second position with the valve disc maintaining a distance from the seat and the body, wherein the valve member is moveable between the second position and the engagement position in a direction substantially perpendicular to a contact plane defined by the seat, wherein the stem is rotatable about a longitudinal axis thereof between a first rotational position corresponding to the first position of the valve member and a third rotational position corresponding to the engagement position of the valve member with a second rotational position corresponding to the second position of the valve member in between the first and third rotational position, wherein in between the first and second rotational position of the stem the valve member and the stem are coupled according to a first configuration allowing to move the valve member between the first position and the second position, and wherein in between the second and third rotational position of the stem, the valve member and the stem are coupled according to a second configuration different from the first configuration allowing to move the valve member between the second position and the engagement position.

The first aspect of the invention is based on the insight that reduced build-in dimensions and easy and instant operation can be obtained by simply rotating the stem between the first and third rotational position, wherein a first motion of the valve member is carried out between the first and second rotational position due to a first coupling configuration between stem and valve member, and wherein a second motion, different from the first motion, is carried out between the second and third rotational position due to a second coupling configuration between stem and valve member that is different from the first configuration. As a result thereof, the single rotation of the stem results in two different motions of the valve member including approaching the seat in a direction substantially perpendicular to a contact plane defined by the seat allowing to minimize or even avoid wear of the seat and/or the valve member and without having to axially move the single stem thereby reducing the installation space compared to the prior art. Wear of the seat and/or the valve disc during the first motion is avoided by keeping a distance between the valve disc and the seat and between the valve disc and the body.

The ball valve according to U.S. Pat. No. 3,515,371 is considered to have the same purpose as the claimed first aspect of the invention as this ball valve also requires rotation of one component only, in this case the nut operating on the stem, to carry out different motions of the valve member. However, during the entire movement of the valve member, the coupling between the stem and the valve member is the same, namely that the same end of the stem is in operational contact with the same portion of the valve member. It is further noted that the valve member is moved by first simultaneously translating and rotating the stem and subsequently only translating the stem without rotating the stem.

In an embodiment, the valve member includes a flow channel extending through the valve member such that in the first position of the valve member the flow channel is aligned with the first and second port, and wherein the valve disc is a non-through opening portion of the valve member. The first position of the valve member may be referred to as open position allowing a fluid flow through the ball valve, the second position of the valve member may be referred to as an obstructed position as the valve member is at least partially obstructing a fluid flow through the ball valve, and the engagement position of the valve member may be referred to as a closed position preventing a fluid flow through the ball valve.

In an embodiment, in the first configuration, the valve member and the stem are coupled to each other at two distinct locations allowing the valve member to rotate along with the stem about the longitudinal axis of the stem, and wherein in the second configuration the valve member and the stem are coupled to each other only at one of the two locations. By uncoupling the stem and valve member at one location, the valve member is allowed to move in another direction between the second position and the engagement position when the stem is rotated further. Preferably, in the second configuration, the valve member is coupled to the body to prevent rotation of the valve member about the longitudinal axis of the stem and move the valve member in a direction or pivot the valve member about a direction that is perpendicular to the longitudinal axis of the stem towards or from the seat when the valve member and stem are coupled to each other according to a second configuration.

It is noted here that the first and second configurations of the coupling between stem and valve member may alternatively be referred to as the first coupling configuration and the second coupling configuration of the stem and valve member.

In an embodiment, the stem includes a stem portion that is received in a corresponding recess in the valve member, which stem portion and recess are arranged eccentric relative to the longitudinal axis of the stem and which are configured in the second configuration to move the valve member between the second position and the engagement position.

In an embodiment, the body comprises an associated coupling element with a corresponding recess, wherein the stem comprises an associated coupling element with a corresponding recess, wherein the valve member comprises a coupling element with a first locking member and a second locking member connected to a common member that is pivotably connected to the valve member, wherein the first locking member is configured to be received in the recess of the coupling element of the stem in the first configuration, and wherein the second locking member is configured to be received in recess of the coupling element of the body in the second configuration.

An advantage is that the coupling element of the valve member switches between coupling with the stem in the first coupling configuration and with the body in the second configuration, which coupling element is automatically operated upon rotation of the stem.

In an embodiment, the ball valve is configured such that the stem is rotated 90 degrees between the first rotational position and the third rotational position of the stem. Although any angle may be used, the 90 degrees rotational movement of the stem between a corresponding open and closed position and any multiple thereof (i.e. 180 and 270 degrees) provide advantages over any other angle as it can be clearly distinguished which rotational position corresponds to an open valve and a closed valve and whether the stem has sufficiently been rotated to complete the entire movement between first and third rotational position. It is for instance well known to connect a handle to the stem, wherein the handle in the operational position of the ball valve that corresponds to the open position is aligned with a fluid flow direction through the ball valve, i.e. extending from the first port to the second port or vice versa, and wherein the handle in the other operational position of the ball valve that corresponds to the closed position is perpendicular to a fluid flow direction through the ball valve, i.e. extending perpendicular to a direction from the first port to the second port. In this well-known example, the handle as rotated 90 degrees, but the same advantage applies to a rotation of 270 degrees or 180 degrees.

In an embodiment, the ball valve is configured such that the stem is rotated α degrees between the first rotational position and the second rotational position, and β degrees between the second rotational position and the third rotational position, where α and β may have values as shown below in table 1.

TABLE 1

| α (1st to 2nd rotational position) | β (2nd to 3rd rotational position) |
|---|---|
| 45 | 45 |
| 50 | 40 |
| 55 | 35 |
| 60 | 30 |
| 65 | 25 |
| 70 | 20 |
| 75 | 15 |
| 80 | 10 |
| 85 | 5 | possible values for α and β in degrees

Preferably, α is larger or equal to β. Although table 1 includes only values dividable by 5, α can be any value in the range of 45-89 degrees, preferably in the range of 50-85 degrees, more preferably in the range of 60-85 degrees and most preferably in the range of 70-85 degrees with β being chosen such that the sum of α and β is 90 degrees. As an example, a may be 82 degrees and β may be 8 degrees or a may be 83 degrees and β may be 7 degrees.

The above embodiment relates to a total rotation of 90 degrees between first and third rotational position. Multiplying the provided values with a factor 2, 3 or 4 changes the embodiment to the situation in which the total rotation is 180, 270 or 360 degrees, respectively.

In an embodiment, irrespective of the total angle, it is preferred that the angle α is at least larger than angle β, preferably at least 1.5 times larger, more preferably at least 2 times larger, and most preferably at least 3 times larger.

The first aspect of the invention also relates to a method to operate a ball valve to regulate, direct or control a fluid flow through the valve, said valve comprising:
 a body with a first port, a second port and an interior space extending between the first and second port;
 a seat arranged in the interior space of the body;
 a valve member moveably arranged inside the interior space of the body to cooperate with the seat, wherein the valve member includes a valve disc configured to engage with the seat in an engagement position of the valve member; and
 a stem engaging with the valve member to move the valve member,
and said method comprising the following steps:
 a) rotating the stem about a longitudinal axis thereof from a first rotational position corresponding to a first position of the valve member to a second rotational position corresponding to a second position of the valve member, wherein in the second position of the valve member the valve disc is aligned with the seat at a distance from the seat, wherein in the first position of the valve member the valve disc is at a larger distance from the seat than in the second position, and wherein the valve member is rotated due to a first coupling configuration between valve member and stem from the first position to the second position with the valve disc maintaining a distance from the seat and the body; and
 b) rotating the stem further from the second rotational position to a third rotational position corresponding to the engagement position of the valve member, wherein the valve member is moved due to a second coupling configuration between valve member and stem that is different from the first coupling configuration from the second position to the engagement position in a direction substantially perpendicular to a contact plane defined by the seat.

The first aspect of the invention further relates to a method to operate a ball valve to regulate, direct or control a fluid flow through the valve, said valve comprising:
 a body with a first port, a second port and an interior space extending between the first and second port;
 a seat arranged in the interior space of the body;
 a valve member moveably arranged inside the interior space of the body to cooperate with the seat, wherein the valve member includes a valve disc configured to engage with the seat in an engagement position of the valve member; and
 a stem engaging with the valve member to move the valve member,
and said method comprising the following steps:
 a) rotating the stem about a longitudinal axis thereof from a third rotational position corresponding to the engagement position to a second rotational position corresponding to a second position of the valve member, wherein in the second position of the valve member the valve disc is aligned with the seat at a distance from the seat, wherein the valve member is moved due to a second coupling configuration between valve member and stem from the engagement position to the second position in a direction substantially perpendicular to a contact plane defined by the seat; and
 b) rotating the stem further from the second rotational position to a first rotational position corresponding to a first position of the valve member, wherein in the first position of the valve member the valve disc is at a larger distance from the seat than in the second position, and wherein the valve member is rotated due to a first coupling configuration between valve member and stem that is different from the second coupling configuration from the second position to the first position with the valve disc maintaining a distance from the seat and the body.

It is explicitly noted here that features and embodiments of the first aspect of the invention relating to the ball valve may also readily apply to the corresponding methods without repeating these features and embodiments here again. As a mere example, the mentioned angles over which the stem is rotated between first and second rotational position and between second and third rotational position may apply here as well.

According to a second aspect of the invention, there is provided a ball valve comprising:
 a housing provided with an inlet opening and an outlet opening, which are in fluid communication with each other, and with a flow path that extends from the inlet opening to the outlet opening;
 a closing body, which comprises a flow channel, the closing body being rotatably received in the housing in the flow path between the inlet opening and the outlet opening, such that the flow channel in the closing body in the first open position of the closing body is part of the flow path;
 a valve seat, which is arranged in the housing for cooperation with the closing body;
 the closing body being rotatable between a first open position and a second closed position; wherein the closing body in the second closed position engages with the valve seat using a closed part of the closing body and closes the flow path;

a valve bolt, that is connected to the closing body to rotate the closing body, wherein the closing body has a third pivot position between the first open position and the second closed position, wherein the closing body rotates contact free in the housing between the first open position and the third pivot position, and wherein between the third pivot position and the second closed position the closing body is locked in the housing in the rotational direction such that the closing body moves radially relative to the valve bolt and engages with the valve seat.

By rotating the closing body from the open position to the pivot position, at a distance from the housing and the valve seat, there will be no wear between the housing parts and the closing body, preventing leakage of the ball valve. By locking the closing body in the rotational direction, and by displacing the closing body in the radial direction only relative to the valve bolt towards the valve seat in the last rotation part range of the valve bolt, a good seal of the ball valve is obtained without relative tangential displacement or rotation between the closing body and the housing. In case of contamination, scaling, etc., in the ball valve, the closing body is first returned to its freely rotatable pivot position, such that without any direct contact between the closing body and the housing the closing body can be rotated to the open position.

Preferably, the ball valve is provided with an eccentric assembly used to move the closing body towards the valve seat between the third pivot position and the second closed position. This eccentric assembly moves the closing body radially from and to the valve seat when the closing body is locked to the housing and the closing body can no longer rotate in the housing. The eccentric assembly converts the second rotation part range of the valve bolt into a radial (pivotal) movement of the closing body towards the valve seat.

In particular, the eccentric assembly comprises: a bolt eccentric element that is connected to the valve bolt or forms an integral part therewith, and a closing body part, wherein due to rotation of the valve bolt about its axis the bolt eccentric element rotates relative to the closing body part such that the closing body is displaced radially relative to the valve bolt. Because the closing body is locked with respect to the housing to prevent a rotational movement, the rotational movement of the valve bolt and the bolt eccentric element connected thereto can move the closing body radially relative to the valve bolt towards the valve seat.

In a preferred embodiment of the invention, the closing body is provided with a locking element, wherein the locking element in a first locking position between the first open position and the third pivot position of the closing body locks (couples) the closing body with the valve bolt (possibly via the bolt eccentric element), and wherein the locking element in a second locking position between the third pivot position and the second closed position of the closing body locks (couples) the closing body with the housing. Due to these measures the closing body can be coupled (locked) with the bolt eccentric element in the first rotation part range of the valve bolt and subsequently be coupled (locked) with the housing in the second rotation part range.

Preferably, the bolt eccentric element is provided with a first guiding element with a first stop element; and wherein the housing is provided with a second guiding element and a second stop element. Due to this the locking element can change the coupling of the closing body with the valve bolt and/or the bolt eccentric element in the third pivot element for a rotational movement to a coupling with the housing for a radial (pivot) movement towards the valve seat.

In particular the locking element comprises a first locking member and a second locking member, wherein the first locking member cooperates with the first stop element of the first guiding element, and the second locking member cooperates with the second stop element of the second guiding element. By using two locking members on the locking element the closing body can be locked to the valve bolt and/or the bolt eccentric element in the first rotation part range for rotating the closing body and the closing body can be locked to the housing in the second rotation part range to prevent further rotation of the closing body.

In the shown embodiment, the locking element is provided with a locking axis, with which the locking element can rotate relative to the closing body.

BRIEF DESCRIPTION OF THE DRAWINGS

The invention will now be described in a non-limiting way by reference to the accompanying drawings in which:

FIGS. 4A-4C schematically depict the transition of the valve member from the first position to an engagement position;

FIG. 5 schematically depicts a coupling element of the valve of FIG. 1;

FIGS. 9A-9C schematically depict the first open position, the third pivot position and the second closed position of the closing body, respectively, of the ball valve according to the second aspect of the invention.

DETAILED DESCRIPTION OF THE INVENTION

Figure 1:
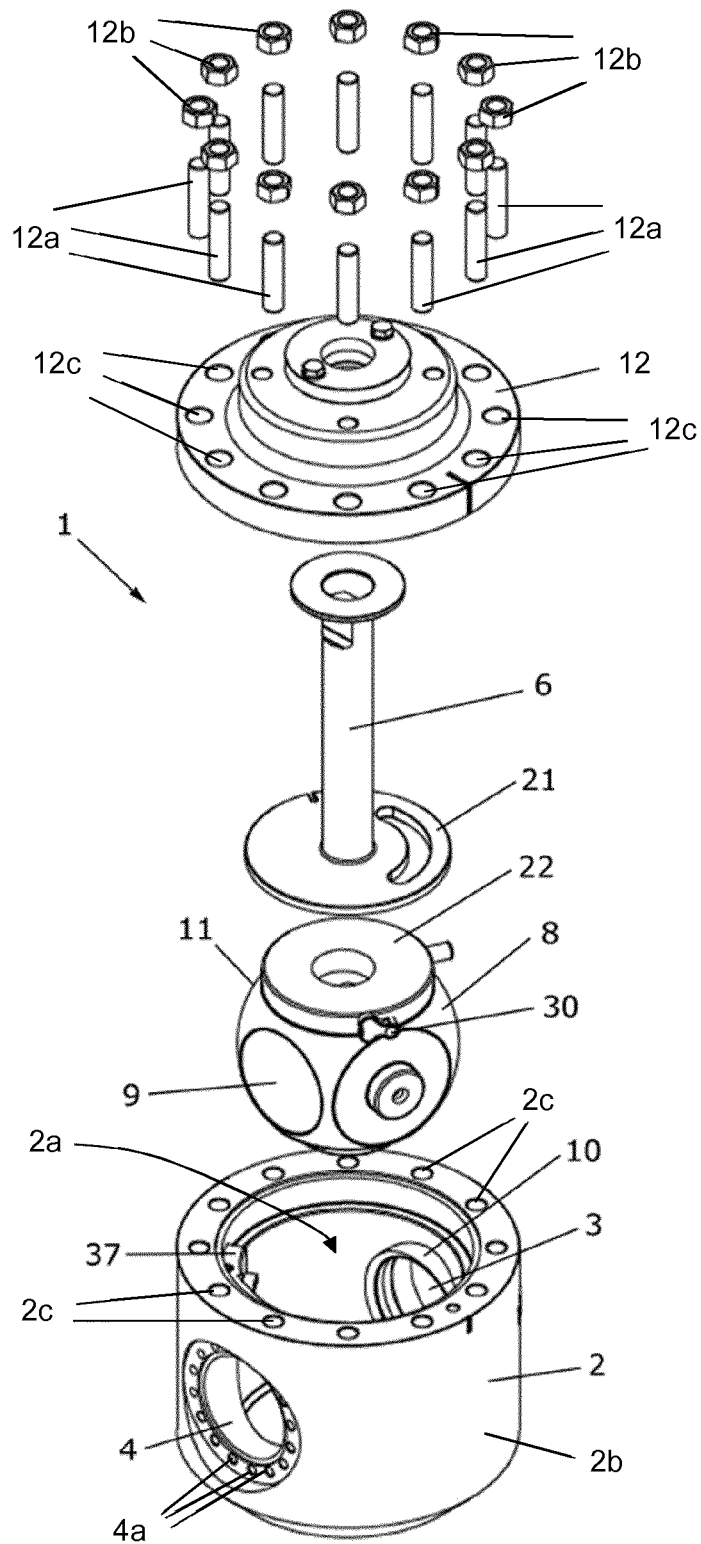
FIG. 1 schematically depicts an exploded perspective view of a valve according to an embodiment of the first aspect of the invention.
Figure 2A:
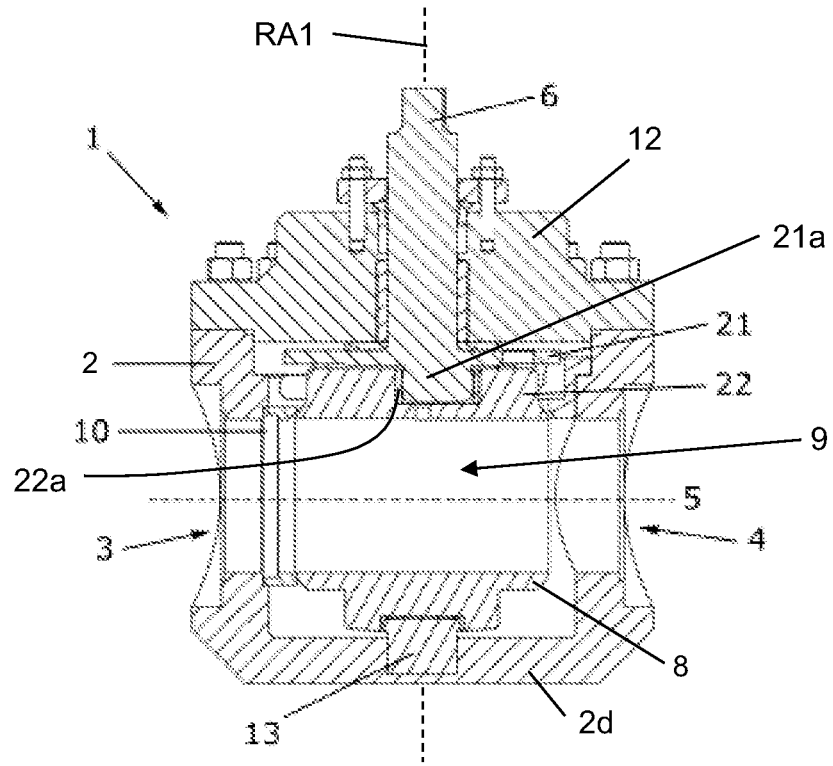
FIG. 2A schematically depicts a cross-sectional view of the valve of FIG. 1 with the valve member in a first position.
Figure 2B:
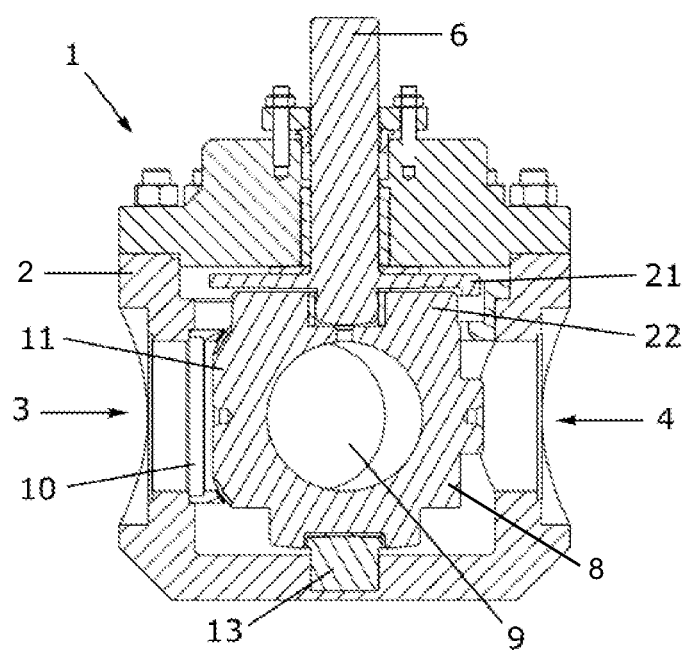
FIG. 2B schematically depicts a cross-sectional view of the valve of FIG. 1 with the valve member in a second position.

FIGS. 1, 2A and 2B schematically depict a ball valve 1 according to an embodiment of the first aspect of the invention. FIG. 1 depicts an exploded perspective view of the valve 1 while FIG. 2A and FIG. 2B depict a cross-sectional view of the valve 1 in two different states.

The valve 1 is configured to regulate, direct or control a fluid flow, e.g. a gas or a liquid, through the valve 1. In this embodiment, the valve 1 has two states, an open state, in which the fluid flow through the valve 1 may be maximal, and a closed state in which there is no fluid flow through the valve 1. However, the first aspect of the invention is also applicable to other types of valves, e.g. a three-way or a four-way valve. Valves according to the first aspect of the invention are frequently used in the process industry and installations and arranged in between two or more pipe portions.

The valve 1 comprises a body 2 having a first port 3, a second port 4 and an interior space 2a extending between the first port 3 and the second port 4. The first and second port 3, 4 are passages that allow fluid to pass through the valve.

Figure 3A:
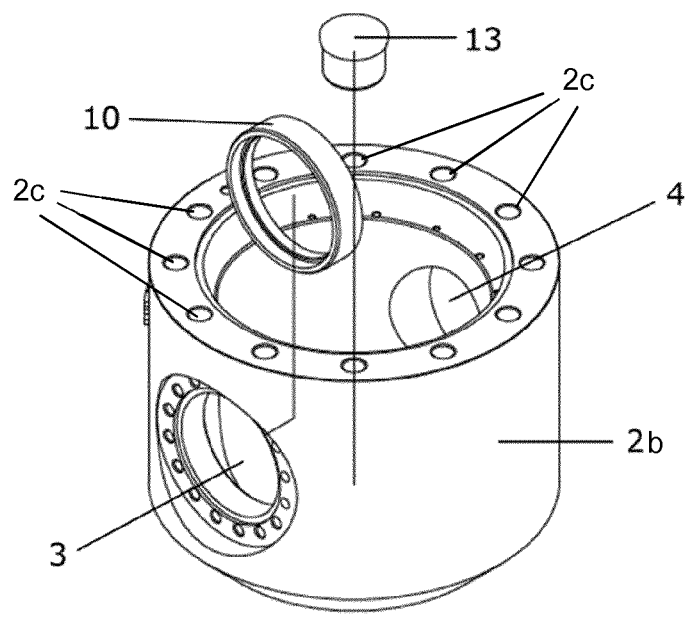
FIG. 3A schematically depicts an exploded perspective view of a body portion with seat of the valve of FIG. 1.
Figure 3B:
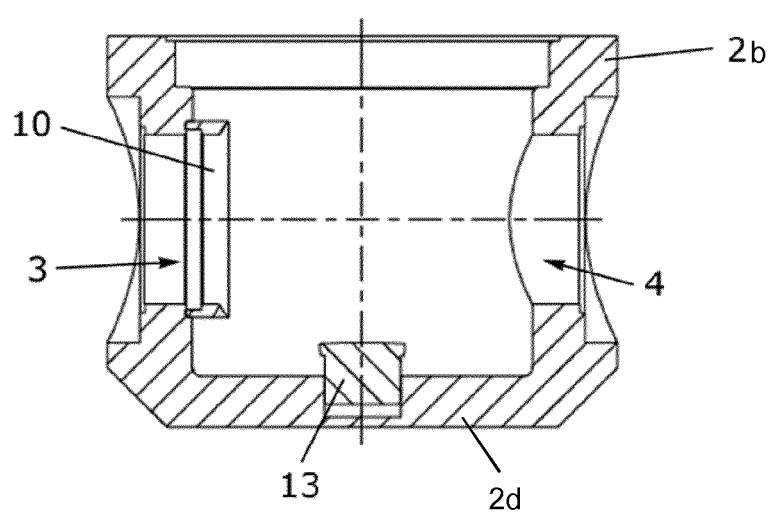
FIG. 3B schematically depicts a cross-sectional view of the body portion and seat of FIG. 3A.

In this embodiment, the body 2 includes a bottom part 2b with the first port 3 and the second port 4 and delimiting most of the interior space 2a. FIGS. 3A and 3B depict the bottom part 2b in more detail, where FIG. 3A is an exploded perspective view and FIG. 3B is a cross-sectional view.

At the top side the interior space 2a is delimited by a top part 12 of the body 2. Bolts 12a and nuts 12b are used to connect the top part 12 to the bottom part 2b. The bottom part 2b includes threaded holes 2c to receive corresponding threaded ends of the bolts 12a. The top part 12 also comprises a hole 12c per bolt 12a. The opposite ends of the bolts 12a that extend through the holes 12c are also threaded to mate with the nuts 12b thereby allowing to clamp the top part 12 to the bottom part 2b. In FIG. 1 only some of the bolts 12a, nuts 12b, holes 2c and holes 12c and in FIG. 3A only some of the holes 2c are indicated using a corresponding reference symbol to keep the drawings as clear and simple as possible.

The first port 3 and the second port 4 include fastening means, in this case threaded holes, to connect a pipe portion (not shown) to the respective port. In FIG. 1 only threaded holes 4a associated with the second port 4 are visible and again only a few holes have been indicated using reference symbol 4a to keep the drawing as clear and simple as possible. Other connection methods such as compression fittings, glue, cement, flanges or welding are also envisaged.

Although not necessary per se, the body 2 in the embodiment of FIG. 1 has a cylindrical sidewall including the first and second ports 3, 4 at opposite sides of the sidewall, a bottom 2d connected to the cylindrical sidewall to form the bottom part 2b and a lid forming the top part 12. Other shapes and configurations of the body 2 are also envisaged. The body 2 may alternatively be referred to as outer casing and the top part 12 may alternatively be referred to as bonnet.

The valve 1 further comprises a seat 10 at the first port 3 and thus arranged in the interior space 2a of the body 2. The seat 10 cooperates with a valve member 8, alternatively referred to as ball, to close or open the first port 3. The ball 8 therefore comprises a valve disc 11, and a flow channel 9 extending through the ball 8.

The ball 8 is moveably arranged inside the interior space 2a of the body 2. In this case the ball 8 is rotatable about a rotation axis RA1 defined by axle 13 arranged at the bottom 2d of the body 2 and engaging with the ball 8 at a lower side, and a stem 6 engaging with the ball 8 at an upper side opposite the lower side.

The stem 6 extends through the top part 12 and is configured to transmit motion from a handle and/or controlling device (not shown) to the ball 8. The ball 8 is rotatable about rotation axis RA1 by the stem 6 between a first position as shown in FIG. 2A and FIG. 4A and a second position as shown in FIG. 2B and FIG. 4B.

In this embodiment, in the first position, the flow channel 9 is aligned with the first and second port 3, 4 to allow the passage of fluid from the first port 3, via the flow channel 9 to the second port 4 or vice versa. Hence, the first port 3 may function as inlet, exit or both, and the second port 4 may function as exit, inlet or both, respectively. In the embodiment of the FIGS. 1 and 2A, a longitudinal axis 5 of the flow channel 9 extends between the first and second port 3, 4, and preferably extends through a center of the first and second port 3, 4. In a preferred embodiment, a cross-sectional area of the flow channel is at least as large as the cross-sectional are of the first and second port, so that the flow channel does not introduce additional flow resistance or pressure drop over the valve 1.

Movement of the ball 8 in the body 2 will now be described in more detail by also referring to FIGS. 4A to 4C. Each FIG. 4A to 4C depicts a cross-sectional view of the ball 8 and the seat 10 along a plane extending perpendicular to the rotation axis RA1 and through the longitudinal axis 5 of the flow channel 9. Above the cross-sectional views a side view is provided depicting the corresponding mutual positions and orientations of the stem 6, the ball 8 and the body 2 by indicating the position of a coupling element 21, which is part of or connected to the stem 6, a coupling element 30 pivotably connected to the ball 8, and a coupling element 37 which is part of connected to the body 2, see also FIGS. 1, 2A and 2B.

The coupling element 30, which is depicted in more detail in FIG. 5, comprises a first locking member 32 and a second locking member 33 connected to a common member 34. The member 34 is pivotably connected to an upper part 22 of the ball 8 to pivot about a pivot axis that in this case is perpendicular to the rotation axis RA1.

The coupling element 21 has a portion 35 including a recess 36 to receive first locking member 32. The coupling element 37 includes a recess 38 to receive the second locking member 33.

In the first position of the ball 8 relative to the body 2, as shown in FIG. 4A, the first locking member 32 of the coupling element 30 is received in the recess 36 of the coupling element 21 thereby coupling the ball 8 to the coupling element 21 and thus to the stem 6 according to a first coupling configuration. Rotation of the stem 6 about the rotation axis RA1 between a first rotational position and a second rotational position thus allows to rotate the ball 8 between the first position of FIG. 4A, corresponding to the first rotational position of the stem 6, and the second position of FIG. 4B, corresponding to the second rotational position of the stem 6. The coupling element 37 is configured such that during a rotation between the situations in FIG. 4A and FIG. 4B, the coupling element 30 and thus the ball 8 is free to rotate relative to the body 2. In fact, as is preferred, FIG. 4A shows that the coupling element 37 is configured such that the first locking member 32 is not able to leave the recess 36 when travelling between the situations in FIG. 4A and FIG. 4B.

FIG. 4B depicts the situation in which the ball 8 reaches the second position as mentioned before. At the same time, the second locking member 33 of the coupling element 30 reaches the recess 38 in the coupling element 37 so that the first locking member 32 can leave the recess 36 and the second locking member 33 can move into the recess 38 thereby uncoupling the ball 8 from the coupling element 21 and coupling the ball 8 to the body 2. As a result thereof, rotation of the ball 8 about the rotation axis RA1 relative to the body is no longer possible. Hence, the coupling configuration between stem 6 and ball 8 has changed from the first coupling configuration, in which the ball 8 is engaged with or coupled to a protrusion 21a of the stem 6 and is also coupled to the coupling element 21 of the stem 6, to a second coupling configuration in which the ball 8 is only engaged with or coupled to the protrusion 21a of the stem 6.

It is noted that in this embodiment, the ball is only rotated a part of its rotation, here about 75 degrees, between the first position and the second position. However, as the coupling element 21 has been uncoupled from the ball 8, the stem 6 and the coupling element 21 are able to rotate further in the same direction to a third rotational position of the stem 6 as shown in FIG. 4C. In the situation of FIG. 4C, the stem 6 and the coupling element 21 have rotated the remaining part of its 90 degrees rotation, here an additional 15 degrees, compared to the second rotational position of FIG. 3B. Hence, in total, the stem 6 and the coupling element 21 have rotated about 90 degrees between the first rotational position in FIG. 3A and the third rotational position in FIG. 3C while the ball 8 only has rotated a part thereof, here about 75 degrees, about the rotation axis RA1. During the remaining part of the rotation, here during the additional 15 degrees, the stem 6 causes the ball 8 to be pressed against the seat 10 with its valve disc 11 thereby obtaining a seal-tight connection between the ball 8 and the seat 10 and obstructing any fluid flow through the valve 1.

Pressing the valve disc 11 against the seat 10 is caused by a protrusion 21a of the stem 6 that is received in a corresponding recess 22a in the upper part 22 of the ball 8, which protrusion 21a and recess 22a are positioned eccentric with respect to the rotation axis RA1 of the stem 6. Hence, when the stem 6 is rotated about rotation axis RA1 and rotation of the ball 8 about the rotation axis RA1 is blocked, the eccentric protrusion 21a and recess 22a cause the ball 8 to move towards the seat 10. In this embodiment, this movement of the ball 8 towards the seat 10 is in fact a pivotal movement of the ball 8 about a pivot axis that is perpendicular to the rotation axis RA1 and perpendicular to the plane of the drawing in FIG. 2A. It is noted that the axle 13 and/or the ball 8 may be embodied such that this movement does not result in undesired deformations or loads in the ball 8, body 2 or axle 13. The position of the ball 8 in FIG. 4C is referred to as the engagement position as this is the position of the ball 8 in which the valve disc 11 of the ball 8 engages with the seat 10.

It is noted that the valve disc 11 being at a larger distance from the seat 10 in the first position than in the second position is obtained in the above described embodiment by rotation of the valve member 8 about the rotation axis RA1, such that the valve disc 11 is rotated away from the seat when moving from the second position to the first position.

Although in the above embodiment, the valve disc is a non-through opening of the valve member, so that the valve disc in the engagement position of the valve member closes of the first port 3. However, the first aspect of the invention also applies to a valve in which the valve disc surrounds an opening in the valve member so that the valve disc in the engagement position of the valve member allows fluid to flow through the valve member.

Figure 6:
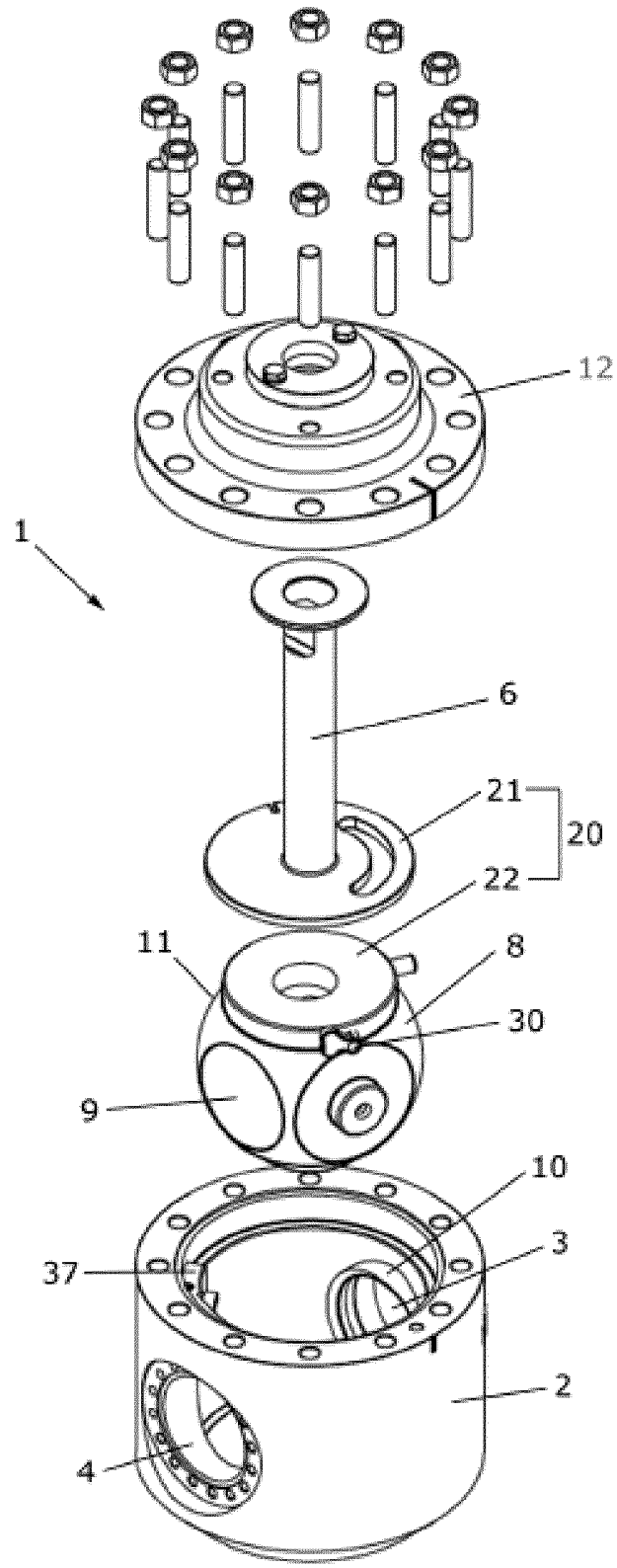
FIG. 6 depicts an exploded view of the ball valve according to the second aspect of the invention.

FIG. 6 depicts an exploded perspective view of the ball valve according to the second aspect of the invention. The ball valve 1 comprises a housing 2, in which an inlet opening 3 and an outlet opening 4 are provided. The ball valve is arranged in a pipe portion (not shown) with the inlet opening and the outlet opening, so that the fluid flow through the pipe can be interrupted externally by closing the ball valve. To this end, the ball valve is provided with a closing body 8 in the housing 2. The closing body 8 is provided with a flow channel 9 through which the fluid can flow when the flow channel makes a connection between the inlet opening and the outlet opening and forms a flow path. The closing body is connected to a valve bolt 6, which extends through the lid 12 of the housing 2, such that upon rotation of the valve bolt, e.g. using a lever, the closing body is partially rotated, so that the flow channel in the closing body is at an angle with the flow path between the inlet opening and the outlet opening, and a closed part 11 of the closing body interrupts the fluid flow.

To obtain a good sealing between the closed part 11 of the closing body 8 and the inlet opening 3 of the housing 2, the inlet opening is provided with a valve seat 10, in the shown exemplary embodiment embodied as a ring-shaped sealing ring. To prevent leakage of the fluid through the closed ball valve the closing body 8 needs to be pressed with some force against the valve seat 10. To prevent wear of the closing body 8 and the valve seat 10 the closing body is frictionlessly, without making contact with the housing and/or the valve seat, rotated from the open position to the closed position. To this end an eccentric assembly 20 is provided and a locking element 30. Operation of the ball valve according to the invention will be described in more detail in the below figures.

Figure 7A:
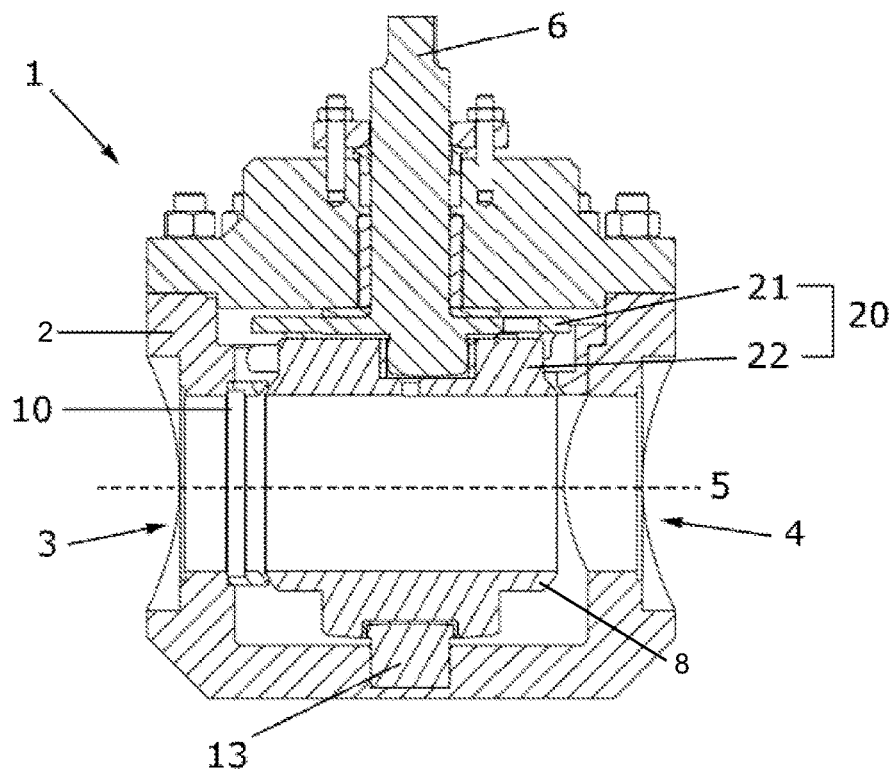
FIG. 7A depicts a cross section of the ball valve of FIG. 6 in the first open position of the closing body.
Figure 7B:
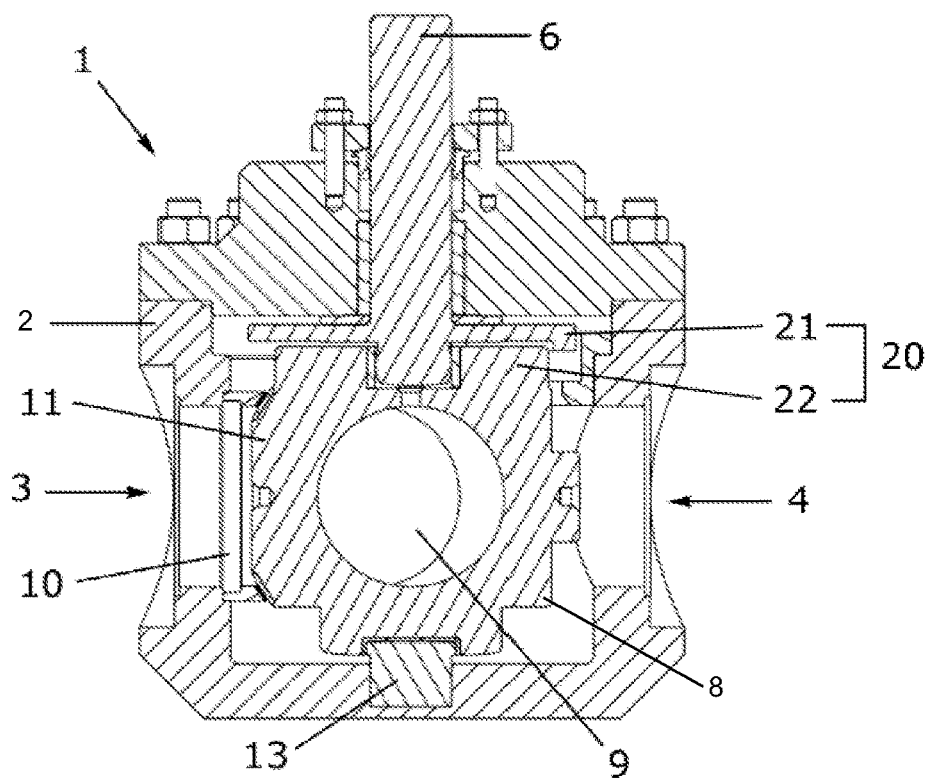
FIG. 7B depicts a cross section of the ball valve of FIG. 6 in the second closed position of the closing body.

FIGS. 7A and 7B depict a cross section of the ball valve 1 of FIG. 6, where FIG. 7A depicts the ball valve in the first open position and FIG. 7B depicts the ball valve in the second closed position. In the open position in FIG. 7A, a flow path 5 is formed between the inlet opening 3 and the outlet opening 4 allowing the fluid in the piping to flow freely through the ball valve. In the closed position of FIG. 7B, the closed part 11 of the closing body 8 is pressed against the valve seat 10, so that the inlet opening 3 is closed and no fluid is able to flow from the inlet opening 3 to the outlet opening 4 and vice versa. The closing body is connected to the valve bolt 6, such that due to rotation of the valve bolt the closing body is rotated between the open position and the closed position. The housing 2 is provided with a pivot bolt 13 at the opposite side of the valve bolt 6. The closing body 8 is able to freely rotate about the pivot bolt 13 at a certain distance from the housing, such that there is no friction between the housing and the closing body.

The ball valve 1 is further provided with an eccentric assembly 20, which in the shown exemplary embodiment comprises a bolt eccentric element 21 and a closing body part 22. The purpose of this eccentric assembly is to pivot the closing body to the valve seat 10 or, generally speaking, to move/displace the closed part 11 of the closing body 8 in a substantially radial direction relative to the valve bolt from and to the valve seat 10. In the shown embodiment of FIGS. 7A and 7B, the valve bolt 6 and the bolt eccentric element 21 connected thereto can freely rotate relative to the closing body and the closing body part 22. For coupling the closing body to the valve bolt a locking element 30 is provided on the closing body (see FIG. 6). By means of the locking element 30, the closing body 8 can be coupled to the valve bolt 6 or to the housing 2. This allows the possibility to frictionlessly rotate the closing body in the housing 2 in a first rotation part range of the valve bolt and to radially move the closing body towards the valve seat 10 in a second rotation part range of the valve bolt without rotating the closing body relative to the housing.

Figure 8A:
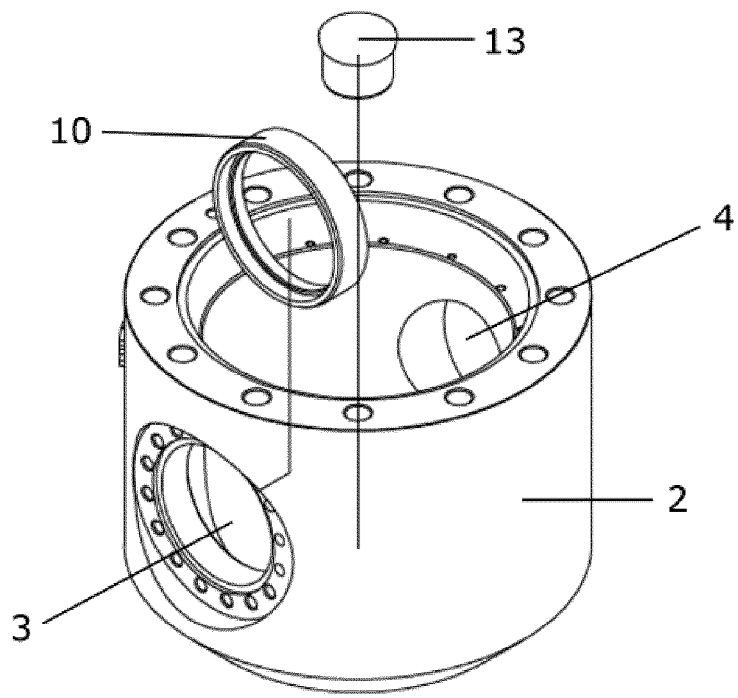
FIG. 8A depicts the housing with valve seat of the ball valve according to the second aspect of the invention.
Figure 8B:
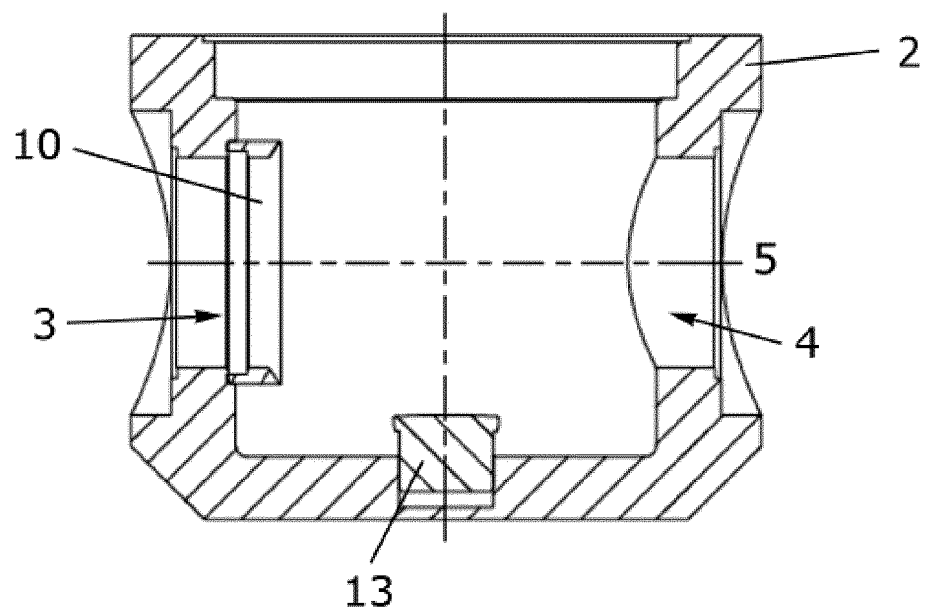
FIG. 8B depicts a cross section of the housing of FIG. 8A.

The FIGS. 8A and 8B the housing is depicted in more detail. At the inside of the inlet opening 3, in the interior of the housing 2, the valve seat 10 is arranged, here in the form of a ring-shaped sealing ring. At the bottom of the housing 2, the pivot bolt 13 is arranged, The flow path 5 extends between the inlet opening 3 and the outlet opening 4. The inlet opening 3 and the outlet opening 4 can be provided with a pipe connection, to connect to the piping.

FIGS. 9A, 9B, 9C schematically depict in more detail the operation of the ball valve according to the invention. At the bottom side of FIG. 9A, a cross section of the closing body 8 in the first open position is depicted. The flow path 5 extends from the inlet opening 3 to the outlet opening 4 through the valve seat 10. It is clearly seen that there is no contact between the closing body 8 and the valve seat 10 and that the closing body can rotate without friction with the valve seat. In FIG. 9A the rotation of the valve bolt from 0 to 90 degrees is depicted above the closing body 8 in a rotational indication. Above the rotational indication a side view is depicted of the locking assembly with the locking element 30, first guiding element 35 and second guiding element 37. Second guiding element 37 is part of, or is connected to, the housing 2. First guiding element 35 is part of, or is connected to, the valve bolt and/or the bolt eccentric element 21. The locking element 30 is rotatably connected to the closing body (not shown) about a rotation point 34, with the aid of a rotation axis 31 (see also FIG. 10). The locking element 30 is provided with a first locking member 32 and a second locking member 33. The first guiding element 35 is provided with a first stop element 36 and the second guiding element 37 is provided with a second stop element 38.

In the first open position of the ball valve in FIG. 9A is the first locking member 32 received in and locked in the first stop element 36 of the first guiding element 35 in the first locking position of the locking element 30. When the valve bolt and the therewith connected first guiding element 35 are rotated in the direction of the arrow, the first stop element 36 will take the first locking member 32 and the locking element 30 along and rotate them and thus also rotate the closing body 8.

In the third pivot position of the ball valve in FIG. 9B the valve bolt has traveled along the first rotation part range for about 75 degrees. The closing body 8 is also rotated about 75 degrees and the closed part 11 of the closing body is now positioned opposite the valve seat 10. The distance between the valve seat 10 and the closing body is approximately equal to the distance at the first open position in FIG. 9A, so that the closing body was able to rotate frictionless with respect to the housing. Further rotation of the closing body is now prevented by the second guiding element 37 with the second stop element 38. During the transition from the first locking position to the second locking position of the locking element 30 in the third pivot position the second stop element 38 receives the second locking body 33 of the locking element 30 and allows the locking element 30 to pivot or rotate downwards, thereby displacing the first locking member 32 out of the first stop element 36 and disengaging the lock between the first guiding element 35 and the locking element and the closing body connected therewith. When the valve bolt is rotated further along the second rotation part range of about 75 degrees to 90 degrees, the valve bolt connected thereto and/or the bolt eccentric element 21 and the first guiding element 35 rotate further in the direction of the arrow in FIG. 9B such that the closing body 8 does not rotate further. The eccentric assembly 20 will move the closing body 8 now towards the valve seat 10.

FIG. 9C depicts the second closed position of the ball valve, wherein the closed part 11 of the closing body 8 is pressed tight to the valve seat and closes the inlet opening. The locking element 30 is in the second locking position and is not rotated further with respect to FIG. 9B. The first guiding element 35 has been rotated in the second rotation part range, thereby displacing the closing body 8 to the valve seat 10 by the eccentric assembly.

Figure 10:
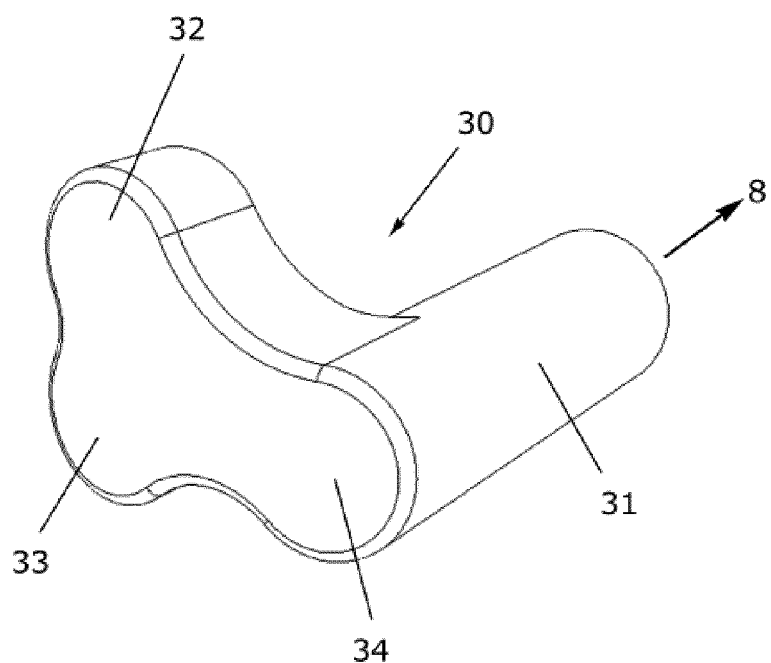
FIG. 10 depicts the locking element according to the second aspect of the invention.

FIG. 10 depicts in more detail an embodiment of the locking element 30. The locking element 30 is connected to the closing body via a rotation axis 31. The locking element 30 is provided with a first locking member 32 and a second locking member 33. The first and second locking member can rotate relative to the closing body 8 about rotation point 34 using rotation axis 31 from the first locking position to the second locking position and vice versa.

The invention claimed is:

1. A ball valve to regulate, direct or control a fluid flow through the valve, comprising:
    a body with a first port, a second port and an interior space extending between the first and second port;
    a seat arranged in the interior space of the body;
    a valve member moveably arranged inside the interior space of the body to cooperate with the seat; and
    a stem engaging with the valve member to move the valve member,
wherein the valve member includes a valve disc configured to engage with the seat in an engagement position of the valve member,
wherein the valve member is moveable between the engagement position and a first position via a second position, wherein in the second position of the valve member the valve disc is aligned with the seat at a distance from the seat, wherein in the first position of the valve member the valve disc is at a larger distance from the seat than in the second position,
wherein the valve member is rotatable between the first position and the second position with the valve disc maintaining a distance from the seat and the body,
and wherein the valve member is moveable between the second position and the engagement position in a direction substantially perpendicular to a contact plane defined by the seat,
wherein the stem is rotatable about a longitudinal axis thereof between a first rotational position corresponding to the first position of the valve member and a third rotational position corresponding to the engagement position of the valve member with a second rotational position corresponding to the second position of the valve member in between the first and third rotational position,
wherein in between the first and second rotational position of the stem the valve member and the stem are coupled according to a first configuration allowing to move the valve member between the first position and the second position, and wherein in between the second and third rotational position of the stem, the valve member and the stem are coupled according to a second configuration different from the first configuration allowing to move the valve member between the second position and the engagement position, and
wherein in the first configuration the valve member and the stem are coupled to each other at two distinct locations allowing the valve member to rotate along with the stem about the longitudinal axis of the stem, and wherein in the second configuration the valve member and the stem are coupled to each other only at one of the two locations.

2. A ball valve according to claim 1, wherein the valve member includes a flow channel extending through the valve member such that in the first position of the valve member the flow channel is aligned with the first and second port, and wherein the valve disc is a non-through opening portion of the valve member.

3. A ball valve according to claim 1, wherein in the second configuration the valve member is coupled to the body to prevent rotation of the valve member about the longitudinal axis of the stem.

4. A ball valve according to claim 1, wherein the stem includes a stem portion that is received in a corresponding recess in the valve member, in which the stem portion and the recess are arranged eccentric relative to the longitudinal axis of the stem and which are configured in the second configuration to move the valve member between the second position and the engagement position.

5. A ball valve according to claim 3, wherein the body comprises a coupling element with a corresponding recess, wherein the stem comprises a coupling element with a corresponding recess, wherein the valve member comprises a coupling element with a first locking member and a second locking member connected to a common member that is pivotably connected to the valve member, wherein the first locking member is configured to be received in the recess of the coupling element of the stem in the first configuration, and wherein the second locking member is configured to be received in recess of the coupling element of the body in the second configuration.

6. A ball valve to regulate, direct or control a fluid flow through the valve, comprising:
   a body with a first port, a second port and an interior space extending between the first and second port;
   a seat arranged in the interior space of the body;
   a valve member moveably arranged inside the interior space of the body to cooperate with the seat; and
   a stem engaging with the valve member to move the valve member,
wherein the valve member includes a valve disc configured to engage with the seat in an engagement position of the valve member,
wherein the valve member is moveable between the engagement position and a first position via a second position, wherein in the second position of the valve member the valve disc is aligned with the seat at a distance from the seat, wherein in the first position of the valve member the valve disc is at a larger distance from the seat than in the second position,
wherein the valve member is rotatable between the first position and the second position with the valve disc maintaining a distance from the seat and the body,
and wherein the valve member is moveable between the second position and the engagement position in a direction substantially perpendicular to a contact plane defined by the seat,
wherein the stem is rotatable about a longitudinal axis thereof between a first rotational position corresponding to the first position of the valve member and a third rotational position corresponding to the engagement position of the valve member with a second rotational position corresponding to the second position of the valve member in between the first and third rotational position,
wherein in between the first and second rotational position of the stem the valve member and the stem are coupled according to a first configuration allowing to move the valve member between the first position and the second position, and wherein in between the second and third rotational position of the stem, the valve member and the stem are coupled according to a second configuration different from the first configuration allowing to move the valve member between the second position and the engagement position, and wherein the ball valve is configured such that the stem is rotated 90 degrees between the first rotational position and the third rotational position.

7. A ball valve according to claim 6, wherein the ball valve is configured such that the stem is rotated $\alpha$ degrees between the first rotational position and the second rotational position and $\beta$ degrees between the second rotational position and the third rotational position, and wherein $\alpha$ is larger than $\beta$.

8. A ball valve according to claim 7, wherein $\alpha$ is in the range of 45-89 degrees.

9. A ball valve according to claim 7, wherein $\alpha$ is in the range of 50-85 degrees.

10. A ball valve according to claim 7, wherein $\alpha$ is in the range of 60-85 degrees.

11. A ball valve according to claim 7, wherein $\alpha$ is in the range of 70-85 degrees.

12. A method to operate a ball valve to regulate, direct or control a fluid flow through the valve, said valve comprising:
   a body with a first port, a second port and an interior space extending between the first and second port;
   a seat arranged in the interior space of the body;
   a valve member moveably arranged inside the interior space of the body to cooperate with the seat, wherein the valve member includes a valve disc configured to engage with the seat in an engagement position of the valve member; and
   a stem engaging with the valve member to move the valve member,
and said method comprising the following steps:
   a) rotating the stem about a longitudinal axis thereof from a first rotational position corresponding to a first position of the valve member to a second rotational position corresponding to a second position of the valve member, wherein in the second position of the valve member the valve disc is aligned with the seat at a distance from the seat, wherein in the first position of the valve member the valve disc is at a larger distance from the seat than in the second position, and wherein the valve member is rotated due to a first coupling configuration between the valve member and the stem from the first position to the second position with the valve disc maintaining a distance from the seat and the body; and
   b) rotating the stem further from the second rotational position to a third rotational position corresponding to the engagement position of the valve member, wherein the valve member is moved due to a second coupling configuration between the valve member and the stem that is different from the first coupling configuration from the second position to the engagement position in a direction substantially perpendicular to a contact plane defined by the seat, and
   wherein the stem is rotated 90 degrees between the first rotational position and the third rotational position.

13. A method according to claim 12, wherein the stem is rotated $\alpha$ degrees between the first rotational position and the second rotational position and $\beta$ degrees between the second rotational position and the third rotational position, and wherein $\alpha$ is larger than $\beta$.

14. A method according to claim 13, wherein $\alpha$ is in the range of 45-89 degrees.

15. A method according to claim 13, wherein $\alpha$ is in the range of 50-85 degrees.

16. A method according to claim 13, wherein $\alpha$ is in the range of 60-85 degrees.

17. A method according to claim 13, wherein $\alpha$ is in the range of 70-85 degrees.

\* \* \* \* \*